April 14, 1925. 1,533,278
J. SLEPIAN
PLATE CIRCUIT EXCITATION
Filed Nov. 20, 1920
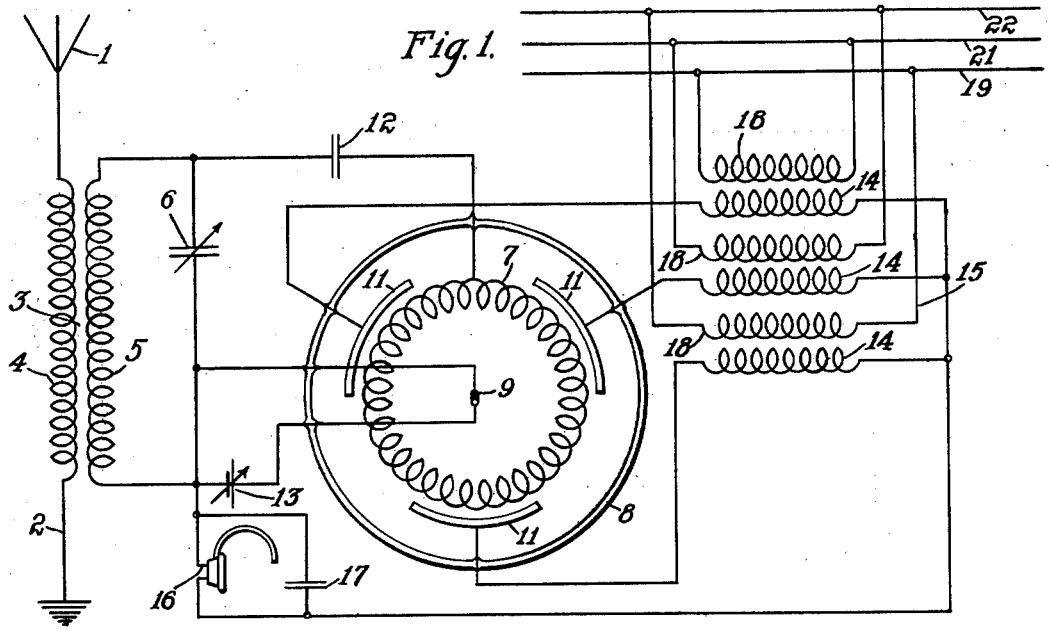
Fig. 1.
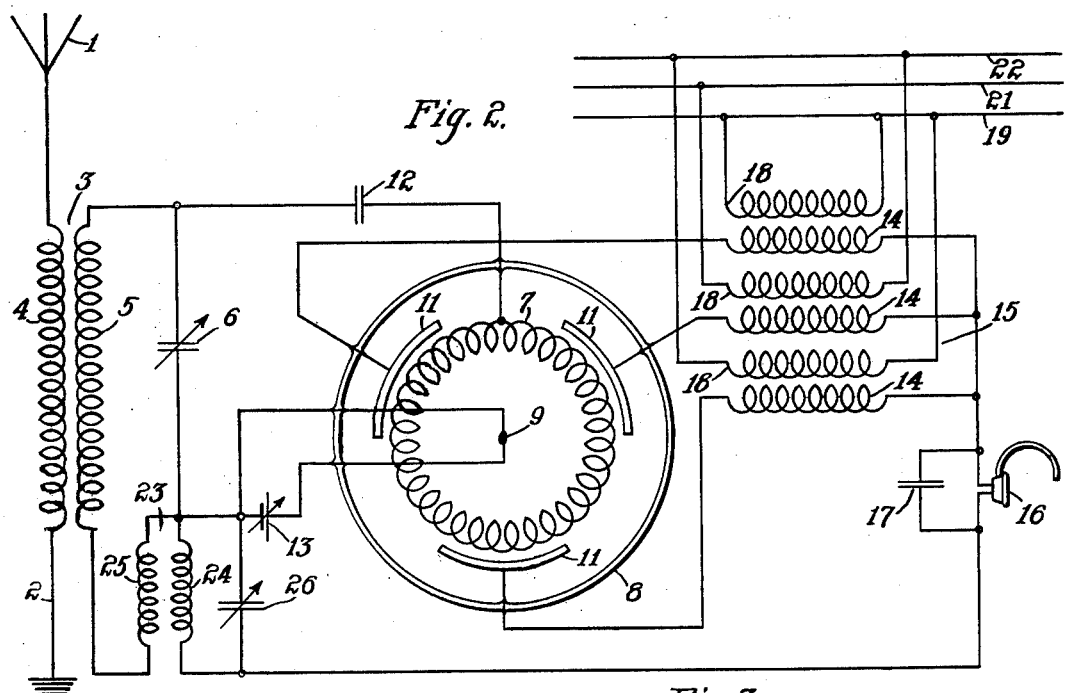
Fig. 2.
Fig. 3.
WITNESSES:
H. T. Shelhamer
H. L. Godfrey
INVENTOR
Joseph Slepian
BY
Wesley G. Carr
ATTORNEY Patented Apr. 14, 1925.

1,533,278

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

PLATE-CIRCUIT EXCITATION.

Application filed November 20, 1920. Serial No. 425,338.

*To all whom it may concern:*

Be it known that I, JOSEPH SLEPIAN, a citizen of the United States, and a resident of Swissvale, in the county of Allegheny and State of Pennsylvania, have invented a new and useful Improvement in Plate-Circuit Excitation, of which the following is a specification.

My invention relates to vacuum-tube circuits and in particular to such tubes in which alternating currents are employed for exciting the plate-filament circuit.

The object of my invention is to provide means for exciting the plate-filament circuit of a vacuum tube by means of a polyphase source of electromotive force.

It is well known that the electron emission in a vacuum tube from a hot cathode to a plate element, is controlled within wide limits by the intensity of the electrostatic field at the surface of the hot cathode. In the ordinary type of vacuum tube, the electrostatic field is produced by inserting a direct current source of electromotive force in the plate-filament circuit.

According to my invention, I provide an arrangement whereby a polyphase source of electromotive force may be included in the plate-filament circuit to produce a flow of current therein similar to that produced by the direct-current-electromotive-force method of plate excitation.

My arrangement comprises a vacuum tube having a plurality of anodes or plates and an n-phase source of electromotive force, one phase for each element, included in a circuit connecting the plurality of anodes and a hot cathode.

The effect of impressing an alternating polyphase voltage upon a plurality of symmetrically spaced plate elements, in the ordinary type of vacuum tube, is to produce, at the surface of the hot cathode, a rotating electrostatic field which is constant in amplitude. By reason of the fact that this rotating electrostatic field remains constant in amplitude, a direct current is caused to flow from a point common to the plurality of electrodes to the hot cathode.

A grid, which is symmetrically located with respect to the cathode, controls the intensity of the rotating electrostatic field at the surface of the hot cathode according to the voltage impressed thereon.

A better understanding of my invention may be had by referring to the accompanying drawings, in which:

Figure 1 is a diagrammatic view of an embodiment of my invention as applied to a detector circuit.

Fig. 2 is a diagrammatic view of my invention as applied to an oscillation generator.

Fig. 3 is a diagrammatic view of a modified polyphase system to compensate for mechanical errors of construction.

Like reference characters are applied to parts having like functions in the several views.

Referring to Fig. 1, an antenna 1 is connected to a ground conductor 2 through a coupling transformer 3 having a primary winding 4 and a secondary winding 5. The terminals of the secondary windings 5, which are shunted by a condenser 6, are connected, respectively, to a grid 7 of a vacuum tube 8 and to a cathode 9.

The vacuum tube 8 comprises a plurality of plate elements 11, symmetrically arranged around the central cathode 9 and the grid 7.

A condenser 12 is inserted in the conductor connecting the grid 7 to one terminal of the secondary winding 5 of the receiving transformer 3. The hot cathode 9 is excited by means of a battery 13, in a manner well known to the art.

The various plate members 11 are connected to suitably disposed primary windings 14 of a transformer 15, said windings having a common connection leading to the hot cathode 9 through a telephone receiver 16. The telephone receiver 16 is shunted by means of a condenser 17, and the secondary windings 18 of the transformer 15 are energized from a polyphase source of energy 19, 21 and 22.

In Fig. 2, substantially the same type of circuit is employed, but, in this arrangement, I provide means for the regenerative amplification of the received impulses. The regenerative amplification is secured by coupling the grid circuit and plate circuit through a regenerative transformer 23 having a primary winding 24 and a secondary winding 25. The primary winding 24 is shunted by a condenser 26.

The effect of any errors in the construction of the tube due to a non-symmetrical location of the grid and plate elements with respect to the hot cathode is to cause a pulsating current to traverse the plate-filament circuit. These defects that may occur in the construction of the tube are compensated for in my invention by employing a modified system of voltages, as illustrated in Fig. 3. Thus, the plates 11, instead of being excited directly from the three-phase source of energy 19, 21 and 22, may be fed from the delta connections 27, 28 and 29, constituting the modified three-phase system.

The operation of the arrangement shown in Fig. 1 is as follows: Upon the impression of an alternating electromotive force upon the anodes 11, a rotating electrostatic field, which is substantially constant in amplitude at the surface of the hot cathode, causes a flow of electrons to the several plate elements 11. The value of the electron streams is such that, at any instant, their sum is that of a current constant in amplitude. Upon the receipt of signals, the value of the electron emission is controlled by the potential variations of the grid 7, with the result that an audible sound is produced in the telephone 16.

The operation of the circuit shown in Fig. 2 is substantially the same as that of Fig. 1. In this arrangement, the regenerative coupling between the grid and plate circuits is effected by means of the coupling transformer 23. In the arrangement shown in Fig. 1, the coupling between the two circuits is effected by the capacity between the grid 7 and the plates 11. On tightening the coupling of the transformer 23, the constants of the plate and grid circuits may be so adjusted that the tube 8 functions as an oscillation generator.

Thus, so far as the exciting potential between the filament and the plate system is concerned, it can be said that the same results are produced as by an ordinary direct-current source of supply. Any incoming signals, therefore, will act upon the detecting device substantially as if the n-phase source of energy were replaced by a battery or direct-current generator.

The advantage of my invention resides in the fact that it embodies means for ensuring the excitation of the plate circuit from an alternating-current source of supply. The use of high voltages, in the direct-current system of plate excitation, requires dynamos of special construction. In the alternating-current system of plate excitation, the voltages applied to the plate-filament circuit may be varied within wide limits by merely changing the transformer ratios.

While I have shown a particular arrangement of tube-elements in the system of plate excitation embodying my invention, it is capable of various modifications within the scope of the appended claims.

I claim as my invention:

1. A system of plate excitation comprising suitably-shaped and spaced elements, an n-phase source of electromotive force to provide one phase for each element, and means for modifying said n-phase source of electromotive force in phase and in magnitude to compensate for mechanical errors occurring in the assembly of said plate elements.

2. The combination with a vacuum-tube device having an electron-emitting cathode, of means for producing a rotating electrostatic field substantially constant in amplitude at the surface of said cathode.

3. In combination, a vacuum tube comprising an electron-emitting cathode, a plurality of plate elements and a polyphase source of electromotive force to provide one phase for each plate element, said plate elements being so arranged with respect to said source of electrons as to produce, at the surface of the electron-emitting cathode, a field substantially constant in amplitude.

4. In combination, a vacuum tube comprising an electron-emitting cathode, a plurality of plate elements and a polyphase source of electromotive force to provide one phase for each plate element, said plate elements being so shaped and arranged with respect to said source of electrons as to produce, at the surface of the electron-emitting cathode, a rotating field substantially constant in amplitude.

5. In combination, a vacuum tube comprising a electron-emitting cathode, a plurality of plate elements and a polyphase source of electromotive force to provide one phase for each plate element, said plate elements being so shaped and arranged with respect to said source of electrons as to produce, in the space immediately adjacent to said cathode, a rotating electrostatic field substantially constant in amplitude.

6. In an arrangement for receiving oscillations, the combination with a resonant circuit of means for intensifying such oscillations, said means comprising a vacuum tube having located therein a plurality of plate elements excited by an n-phase source of electromotive force comprising one phase for each element, an electron-emitting cathode and a controlling grid symmetrically located around said cathode, said plate elements, cathode and n-phase source of electromotive force co-operating to establish a rotating field of force, means for impressing said received oscillations upon said grid, and a circuit including said plurality of plate elements, said source of electromotive force and said cathode.

7. A space-current device having a positive resistance and comprising an electron-emitting cathode and means for establishing a rotating field of force at the surface of said cathode.

8. In combination, a space current device having a positive resistance and including means for establishing a field of force rotating about an axis, and a source of electron emission disposed in said axis in such manner as to be subjected to said field of force.

9. In combination, a space current device having a positive resistance and including means for establishing a substantially uniform field of force and for causing said field of force to revolve about a central axis, and a source of electron emission positioned in said axis and within said rotating field.

10. A space-current device comprising an electron-emitting cathode and means for establishing a rotating electrostatic field of force of substantially constant amplitude at the surface of said cathode to cause a uniform electron emission therefrom.

11. In a device operating substantially in the absence of positive ionization, a plurality of electrodes, certain of said electrodes being disposed substantially in the perimeter of a circle, a remaining electrode being positioned in the center of said circle and adapted to serve as a source of electrons, and means for establishing a rotating electrostatic field of force of uniform intensity at the surface of said centrally positioned electrode.

In testimony whereof, I have hereunto subscribed my name this 10th day of November, 1920.

JOSEPH SLEPIAN.